(12) United States Patent
Yahata et al.

(10) Patent No.: US 7,458,206 B2
(45) Date of Patent: Dec. 2, 2008

(54) EXHAUST GAS PURIFICATION SYSTEM OF INTERNAL COMBUSTION ENGINE

(75) Inventors: Shigeto Yahata, Obu (JP); Makoto Saito, Okazaki (JP); Kazuharu Tochikawa, Kariya (JP)

(73) Assignee: Denso Corporation, Kariya (JP)

( * ) Notice: Subject to any disclaimer, the term of this patent is extended or adjusted under 35 U.S.C. 154(b) by 66 days.

(21) Appl. No.: 11/032,166

(22) Filed: Jan. 11, 2005

(65) Prior Publication Data
US 2005/0154523 A1   Jul. 14, 2005

(30) Foreign Application Priority Data

Jan. 13, 2004   (JP)   ............... 2004-004910
Oct. 12, 2004   (JP)   ............... 2004-297379

(51) Int. Cl.
*F01N 3/00*   (2006.01)
*G01N 19/10*   (2006.01)
(52) U.S. Cl. .............. 60/297; 60/274; 60/277; 60/311; 73/23.26
(58) Field of Classification Search ............. 60/274, 60/276, 277, 295, 297, 311; 73/23.25, 23.26, 73/118.1
See application file for complete search history.

(56) References Cited

U.S. PATENT DOCUMENTS 5,722,236 A * 3/1998 Cullen et al. ............... 60/274
6,438,948 B2 * 8/2002 Ono et al. ................... 60/311
6,823,666 B2 * 11/2004 Odendall ..................... 60/297
6,941,750 B2 * 9/2005 Boretto et al. ............... 60/297
7,017,337 B2 * 3/2006 Plote et al. ................... 60/295
7,031,827 B2 * 4/2006 Trudell et al. ............... 701/114
7,065,960 B2 * 6/2006 Gioannini et al. ............ 60/295
7,153,342 B2 * 12/2006 Koga et al. ................... 95/20
7,159,392 B2 * 1/2007 Kondoh et al. ............... 60/297
7,188,512 B1 * 3/2007 Wills ......................... 73/23.31
7,357,822 B2 * 4/2008 Hamahata et al. ............ 55/283
2003/0097834 A1 * 5/2003 Gabe et al. ................... 60/297
2004/0123586 A1 * 7/2004 Kuboshima et al. .......... 60/277

FOREIGN PATENT DOCUMENTS

JP   2003-27919   1/2003
JP   2003-83035   3/2003

* cited by examiner

*Primary Examiner*—Tu M Nguyen
(74) *Attorney, Agent, or Firm*—Nixon & Vanderhye P.C.

(57) ABSTRACT

An exhaust gas purification system determines a deposited state of particulate matters based on a differential pressure across a diesel particulate filter (DPF) sensed by a differential pressure sensor. An electronic control unit (ECU) of the system prohibits the determination of the deposited state of the particulate matters, which is performed based on the differential pressure, when uniformity of temperature distribution inside the DPF is low. The ECU estimates temperatures at multiple points inside the DPF distant from an inlet along a direction of a flow of exhaust gas based on the temperature at the inlet sensed by an exhaust gas temperature sensor disposed immediately upstream of the DPF. The ECU determines the uniformity of the temperature distribution inside the DPF based on a range of the temperatures at the multiple points.

15 Claims, 8 Drawing Sheets

EXHAUST GAS PURIFICATION SYSTEM OF INTERNAL COMBUSTION ENGINE

CROSS REFERENCE TO RELATED APPLICATION

This application is based on and incorporates herein by reference Japanese Patent Applications No. 2004-4910 filed on Jan. 13, 2004 and No. 2004-297379 filed on Oct. 12, 2004.

BACKGROUND OF THE INVENTION

1. Field of the Invention

The present invention relates to an exhaust gas purification system of an internal combustion engine having a particulate filter. Specifically, the present invention relates to an exhaust gas purification system of an internal combustion engine capable of performing regeneration of a particulate filter at proper timing.

2. Description of Related Art

In recent years, reduction of exhaust emission of internal combustion engines installed in automobiles and the like has been required. Specifically, in a compression ignition diesel engine whose fuel is light oil, it is necessitated to eliminate not only gas such as carbon monoxide, hydrocarbon and nitrogen oxides, but also exhaust particulate matters such as soot and soluble organic fractions contained in exhaust gas. Therefore, a particulate filter is disposed in an exhaust passage for collecting the exhaust particulate matters in the exhaust gas.

If the exhaust gas flows into the particulate filter, the exhaust gas passes through porous partition walls of the particulate filter. At that time, the exhaust particulate matters contained in the exhaust gas are collected by surfaces and pores of the partition walls. If a quantity of the collected and deposited particulate matters increases excessively, a flow resistance in the particulate filter will increase and a back pressure of the engine will increase. As a result, an output of the engine is reduced. Therefore, the exhaust particulate matters deposited on the particulate filter should be occasionally eliminated from the particulate filter to regenerate the particulate filter and to recover the ability of the particulate filter to make the exhaust gas flow downstream.

A certain system, which can perform the regeneration of the particulate filter while the engine is operating, has an oxidation catalyst such as platinum disposed on the particulate filter. The system performs a post-injection for supplying the fuel into the particulate filter in an exhaustion stroke. Thus, the system oxidizes and eliminates the deposited exhaust particulate matters, which are more difficult to oxidize than the injected fuel, by utilizing combustion heat of the fuel.

If the regeneration of the particulate filter is performed frequently, a fuel cost will increase. If a time interval to the next regeneration is too long, the quantity of the deposited exhaust particulate matters will increase excessively, and the deposited exhaust particulate matters will be suddenly burned in the regeneration process. In such a case, there is a possibility that the particulate filter is heated to abnormally high temperature and is damaged. Therefore, the regeneration timing of the particulate filter should be preferably decided by determining the deposited state of the exhaust particulate matters. A system disclosed in Unexamined Japanese Patent Application Publication No. 2003-27919 or No. 2003-83035 senses a differential pressure between an inlet and an outlet of the particulate filter and determines that the regeneration timing is reached when the sensed value of the differential pressure exceeds a predetermined value. This scheme is based on a fact that the differential pressure increases in accordance with the increase in the flow resistance due to the increase of the quantity of the deposited exhaust particulate matters on the particulate filter.

The technology for determining the deposited state of the exhaust particulate matters based on the differential pressure utilizes the fact that the flowing state of the exhaust gas inside the particulate filter changes in accordance with the deposited state of the exhaust particulate matters. Therefore, even if the deposited state is the same, the sensed deposited state will vary if the flowing state of the exhaust gas in the particulate filter varies. In such a case, there is a possibility that the regeneration timing of the particulate filter delays or the regeneration frequency increases.

SUMMARY OF THE INVENTION

It is therefore an object of the present invention to provide an exhaust gas purification system of an internal combustion engine capable of precisely determining a deposited state of exhaust particulate matters in consideration of a flowing state of exhaust gas in a particulate filter.

According to an aspect of the invention, an exhaust gas purification system of an internal combustion engine has a particulate filter disposed in an exhaust passage for collecting exhaust particulate matters contained in exhaust gas. The exhaust gas purification system determines a deposited state of the exhaust particulate matters deposited on the particulate filter based on a state of the exhaust gas such as a differential pressure between an inlet and an outlet of the particulate filter. The exhaust gas purification system includes measuring means and prohibiting means. The measuring means measures temperature distribution in the particulate filter. The prohibiting means prohibits the determination of the deposited state of the exhaust particulate matters when uniformity of the measured temperature distribution is low.

Even when the mass of the gas is the same, the volume thereof differs if the temperature differs. Therefore, when the uniformity of the temperature distribution in the particulate filter is low, uniformity of flow velocity distribution is also low. When the uniformity of the measured temperature distribution is low, the determination of the deposited state of the exhaust particulate matters is prohibited. Thus, the deposited state of the exhaust particulate matters can be determined properly. As a result, the regeneration of the particulate filter at inappropriate timing can be avoided.

BRIEF DESCRIPTION OF THE DRAWINGS

Features and advantages of embodiments will be appreciated, as well as methods of operation and the function of the related parts, from a study of the following detailed description, the appended claims, and the drawings, all of which form a part of this application. In the drawings:

DETAILED DESCRIPTION OF THE REFERRED EMBODIMENTS

First Embodiment

Figure 1:
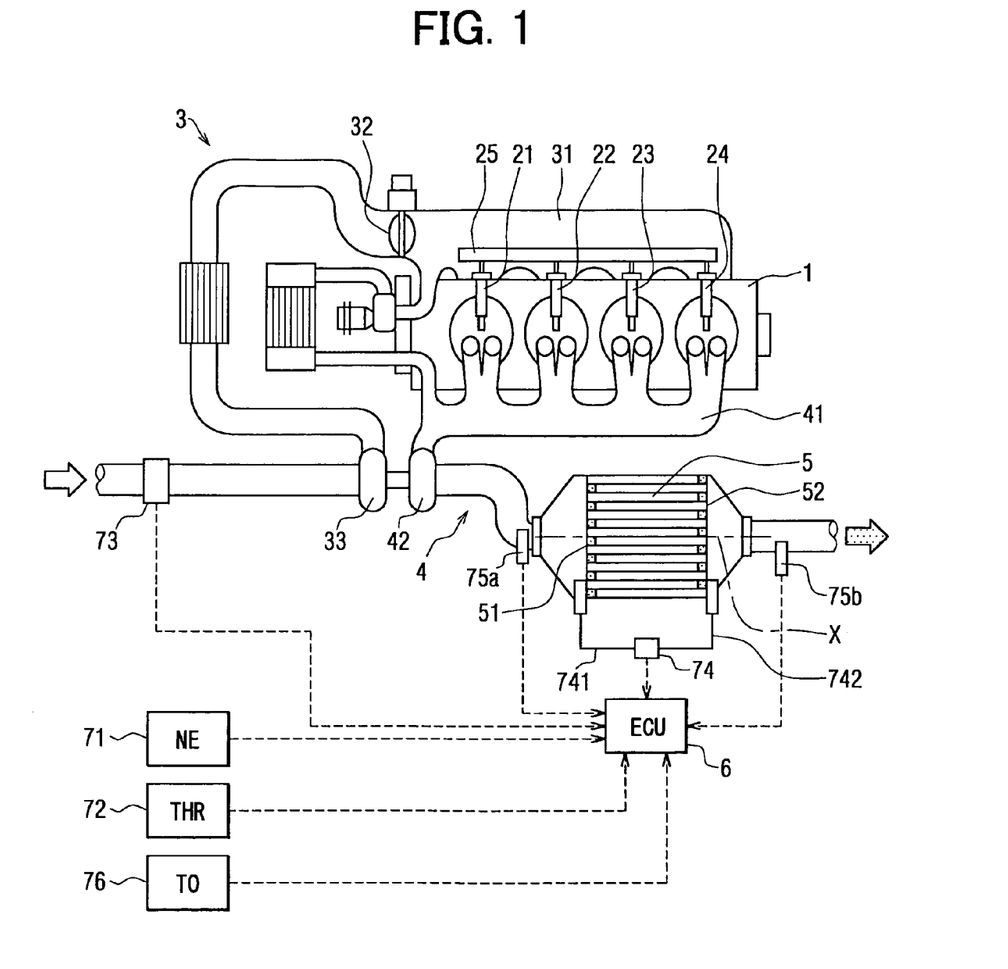
FIG. 1 is schematic diagram showing an exhaust gas purification system of an internal combustion engine according to a first embodiment of the present invention.

Referring to FIG. 1, a diesel engine having an exhaust gas purification system according to a first embodiment of the present invention is illustrated. An engine main body 1 includes multiple (four, in the present embodiment) cylinders. Injectors 21, 22, 23, 24 mounted to the respective cylinders on a one-on-one basis inject fuel into the cylinders. The fuel is supplied to the injectors 21-24 from a common rail 25, which is common to the injectors 21-24. Gas for forming a mixture gas with the fuel is supplied into the cylinders from an intake manifold 31, which provides a downstream portion of an intake passage 3. Exhaust gas generated by combusting the mixture gas is discharged from the respective cylinders to an exhaust manifold 41, which provides an upstream portion of an exhaust passage 4. A turbine 42 of a turbocharger and a particulate filter (a diesel particulate filter: DPF) 5 are disposed in the exhaust passage 4.

The DPF 5 is made of heat-resistant ceramics such as a cordierite molded into honeycomb structure, which is formed with multiple cells serving as gas passages. An end of each cell on an inlet 51 side or an outlet 52 side of the DPF 5 is blocked alternately. Wall surfaces of the cells are coated with an oxidation catalyst such as platinum. The shape of a section of the entire body of the DPF 5 is formed in a circular shape, in which the honeycomb structure appears. The exhaust gas flowing through the exhaust passage 4 flows downstream while passing through the porous partition walls of the cells of the DPF 5. At that time, exhaust particulate matters contained in the exhaust gas are collected and gradually deposited on the DPF 5.

A differential pressure sensor 74 for sensing a differential pressure across the DPF 5 is connected to the exhaust passage 4 for the purpose of measuring the quantity of the particulate matters deposited on the DPF 5 (a PM deposition quantity). One end of the differential pressure sensor 74 is connected to the inlet 51 of the DPF 5 and the other end is connected to the outlet 52 of the DPF 5 through pressure introduction pipes 741, 742 respectively. Thus, the differential pressure sensor 74 outputs a signal corresponding to the differential pressure across the DPF 5 to an electronic control unit (ECU) 6.

Exhaust gas temperature sensors 75a, 75b are respectively disposed immediately upstream and immediately downstream of the DPF 5 in the exhaust passage 4. The exhaust gas temperature sensors 75a, 75b are connected to the ECU 6. The exhaust gas temperature sensor 75a senses the temperature of the exhaust gas at the inlet 51 of the DPF 5 (referred to as a DPF inlet gas temperature, hereafter). The exhaust gas temperature sensor 75b senses the temperature of the exhaust gas at the outlet 52 (referred to as a DPF outlet gas temperature, hereafter). The sensed temperatures are outputted to the ECU 6. A throttle valve 32 is disposed in the intake passage 3. An air flowmeter (an intake air quantity sensor) 73 is disposed upstream of a compressor 33 of a turbocharger in the intake passage 3. Thus, the quantity of fresh air is sensed and a sensed signal is outputted to the ECU 6. An outside air temperature sensor 76 for sensing the temperature of outside air (an outside temperature TO) is connected to the ECU 6.

The ECU 6 is also connected with sensors mounted to an ordinary engine, such as a rotation speed sensor 71 for sensing an engine rotation speed NE and a throttle position sensor 72 for sensing an opening degree of a throttle valve 32 (a throttle opening degree THR). An operating state of the engine is detected based on the sensor signals outputted from the above sensors.

The ECU 6 is structured centering on a microcomputer. The ECU 6 calculates a fuel injection quantity, injection timing and the like corresponding to the operating state detected based on the output signals of the various sensors. Thus, the ECU 6 controls various parts of the engine. The ECU 6 monitors the PM deposition quantity of the DPF 5 to determine whether regeneration timing of the DPF 5 is reached.

Figure 2:
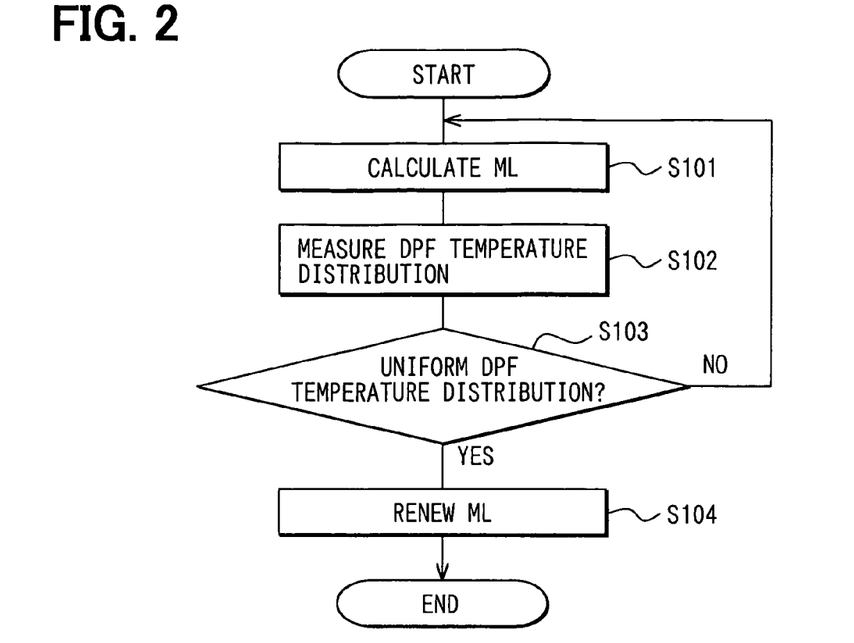
FIG. 2 is a flowchart showing control performed by an ECU of the exhaust gas purification system according to the first embodiment.

Next, control for monitoring the PM deposition quantity, which is performed by the ECU 6, will be explained based on a flowchart shown in FIG. 2.

First, in Step S101, the PM deposition quantity ML is calculated based on the differential pressure $\Delta P$ and a flow velocity of the exhaust gas (exhaust gas flow velocity v). The differential pressure $\Delta P$ increases as the PM deposition quantity ML increases. The exhaust gas flow velocity v decreases as the PM deposition quantity ML increases. The correspondences among the PM deposition quantity ML, the differential pressure $\Delta P$ and the exhaust gas flow velocity v are stored in the form of a map into ROM of the ECU 6 in advance. The exhaust gas flow velocity v is calculated from the quantity of the fresh air sensed by the air flowmeter 73, and the like.

Alternatively, the PM deposition quantity ML may be calculated based on a following formula (1), without using the map.

$$ML = \{\Delta P - (A\mu v + C\rho v^2)\}/(B\mu v + D\rho v^2), \quad (1)$$

In the formula (1), $\mu$ denotes viscosity of the exhaust gas, $\rho$ denotes density of the exhaust gas, and A, B, C, D denote constants.

This formula (1) is derived from a following model formula (2).

$$\Delta P = M\mu v + N\rho v^2, \quad (2)$$

The respective coefficients are adjusted beforehand. In a stage in which the quantity of the collected exhaust particulate matters is small yet, the particulate matters flow toward the pores of the partition walls of the DPF 5 along an exhaust gas stream and clog the pores. This phenomenon is a predominant factor of a pressure loss in the DPF 5, which governs the differential pressure ΔP. Thereafter, as the more pores are clogged with the particulate matters, thickness of the layer of the particulate matters deposited on the surface of the DPF 5 increases. At that time, the increase in the thickness of the layer of the particulate matters deposited on the DPF 5 becomes the predominant factor of the pressure loss. Therefore, a first set of constants A, B, C, D of the formula (1) corresponding to the area of the small PM deposition quantity ML and a second set of constants A, B, C, D corresponding to the area of the large PM deposition quantity ML should be preferably prepared and stored beforehand, and the formula (1) provided by the first or second set of the constants A, B, C, D should be preferably selected and used in accordance with the PM deposition quantity ML. Thus, the PM deposition quantity ML can be calculated very precisely.

In Step S101, the differential pressure ΔP is sensed by the differential pressure sensor 74. The exhaust gas flow velocity v is obtained by performing calculations such as calculation for converting the quantity of the fresh air, which is sensed in terms of a mass flow rate by the air flowmeter 73, into a volumetric flow rate. The sensor signals of the differential pressure sensor 74 and the like are inputted in a predetermined cycle. The processing of Step S101 is performed every time the sensor signals of the differential pressure sensor 74 and the like are inputted.

Then, in Step S102, temperature distribution in the DPF 5 is measured based on the sensor signals of the various sensors. A method of determining the temperature distribution based on the signals of the exhaust gas temperature sensors 75a, 75b will be explained after. As a method of determining the temperature distribution without using the exhaust gas temperature sensors 75a, 75b, a method of determining that uniformity of the temperature distribution is low if the engine is in a transitional operating state, in which the throttle opening degree THR or the engine rotation speed NE changes largely, may be employed.

Then, in Step S103, it is determined whether the temperature distribution in the DPF 5 is uniform. If the result of the determination in Step S103 is "YES", the program proceeds to Step S104. In Step S104, the PM deposition quantity ML is renewed by a value calculated in Step S101. The renewed PM deposition quantity ML is used for the determination of the regeneration of the DPF 5. If the PM deposition quantity ML exceeds a predetermined threshold value, the regeneration processing of the DPF 5 is performed. Thus, if the PM deposition quantity ML exceeds the predetermined threshold value, the particulate filter 5 is regenerated.

If the result of the determination in Step S103 is "NO", the program returns to Step S101 without performing the processing in Step S104.

Generally, even when the mass of a gas is the same, the volume thereof differs if the temperature differs. Therefore, if the uniformity of the temperature distribution in the DPF 5 is low, uniformity in the flow velocity distribution of the exhaust gas is also low. When the uniformity of the measured temperature distribution is low, validation of the PM deposition quantity ML obtained in Step S101 is prohibited. Thus, proper determination of the value of the PM deposition quantity ML can be performed, and the regeneration of the DPF 5 at inappropriate timing can be avoided.

Second Embodiment

Figure 3:
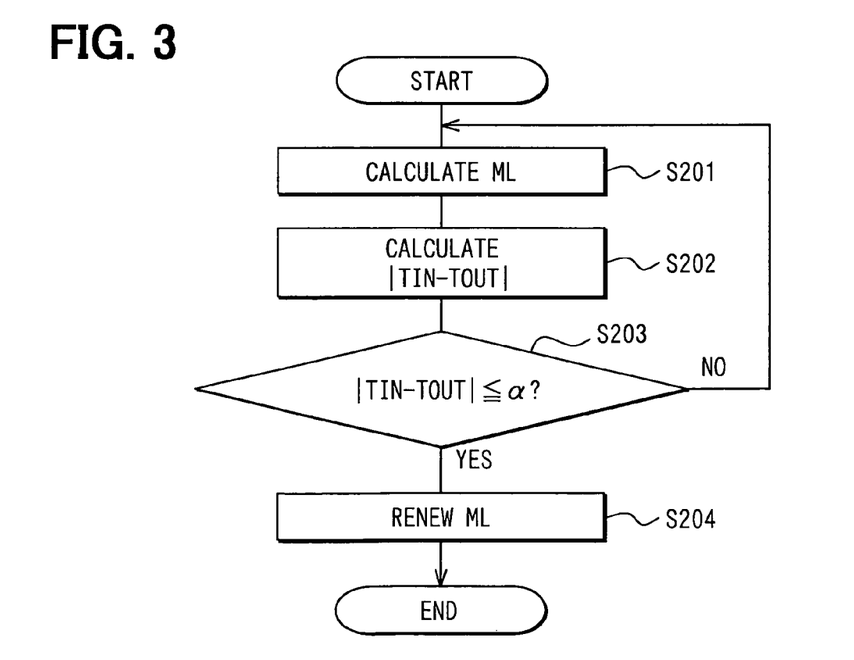
FIG. 3 is a flowchart showing control performed by an ECU of an exhaust gas purification system according to a second embodiment of the present invention.

Next, processing for renewing a PM deposition quantity ML performed by an ECU of an exhaust gas purification system of an internal combustion engine according to a second embodiment of the present invention will be explained based on a flowchart shown in FIG. 3.

In Step S201, the PM deposition quantity ML is measured as in the first embodiment. Then, in Step S202, a difference (an absolute value) between the DPF inlet gas temperature TIN and the DPF outlet gas temperature TOUT is calculated as a value indicating a range of the temperature distribution in the DPF 5. The DPF inlet gas temperature TIN and the DPF outlet gas temperature TOUT are respectively sensed by the exhaust gas temperature sensors 75a, 75b. The DPF inlet gas temperature TIN can be regarded as the temperature of the most upstream part of the DPF 5. The DPF outlet gas temperature TOUT can be regarded as the temperature of the most downstream part of the DPF 5, which is distant from the most upstream part of the DPF 5. Accordingly, an index of the uniformity of the temperature distribution in the DPF 5 can be easily acquired by measuring the DPF inlet gas temperature TIN and the DPF outlet gas temperature TOUT. The uniformity increases as the difference between the DPF inlet gas temperature TIN and the DPF outlet gas temperature TOUT decreases. More specifically, it can be determined that the temperature distribution in the DPF 5 is uniform when the difference between the DPF inlet gas temperature TIN and the DPF outlet gas temperature TOUT resides in a range of ±50° C. (a range from minus 50° C. to plus 50° C.), desirably in a range of ±20° C. (a range from minus 20° C. to plus 20° C.). Since the sensors for measuring the temperature distribution in the DPF 5 can be mounted without machining the DPF 5, the system of present embodiment can be easily implemented.

In Step S203, it is determined whether the difference between the DPF inlet gas temperature TIN and the DPF outlet gas temperature TOUT is "equal to or smaller than" a predetermined reference value α. If the result of the determination in Step S203 is "YES", the PM deposition quantity ML is renewed in Step S204. If the result of the determination in Step S203 is "NO", the program returns to the step S201.

Third Embodiment

Next, processing for renewing a PM deposition quantity ML performed by an ECU of an exhaust gas purification system of an internal combustion engine according to a third embodiment of the present invention will be explained based on FIGS. 4 to 12.

Figure 4:
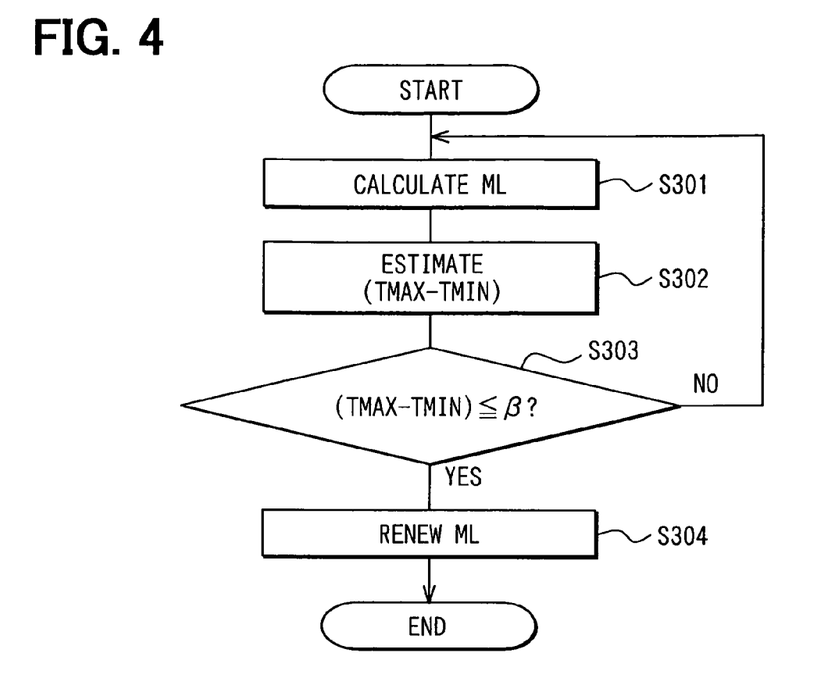
FIG. 4 is a flowchart showing control performed by an ECU of an exhaust gas purification system according to a third embodiment of the present invention.

First, the PM deposition quantity ML is calculated in Step S301. Then, in Step S302, the temperature distribution in the DPF 5 is measured with the use of the exhaust gas temperature sensor 75a, and a difference between the maximum value and the minimum value of the temperatures in the DPF 5 is estimated based on the result of the measurement of the temperature distribution.

Figure 5:
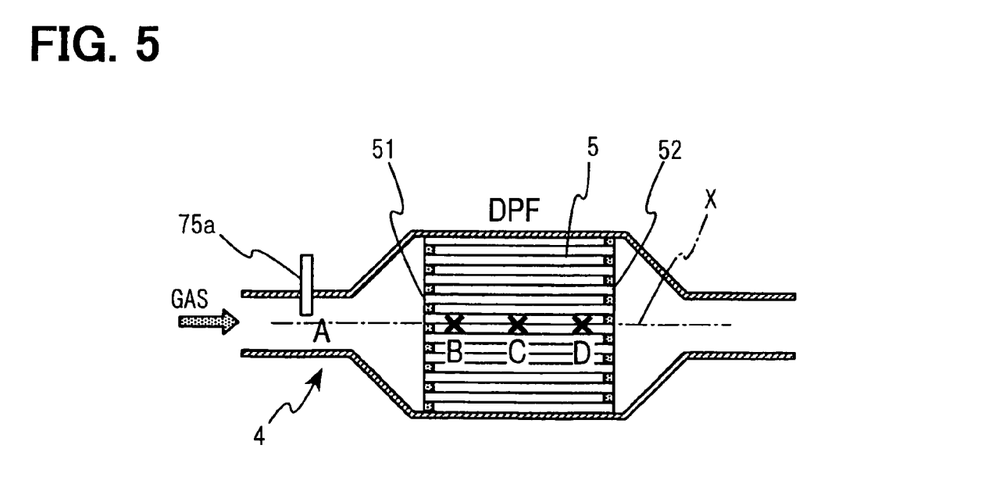
FIG. 5 is a schematic sectional view showing a DPF of the exhaust gas purification system according to the third embodiment.

More specifically, in Step S302, temperatures at multiple points inside the DPF 5 are estimated based on the DPF inlet gas temperature TIN. As shown in FIG. 5, the temperatures are estimated at three estimation points B, C, D on a central line X of the DPF 5 extending along the direction of the flow of the exhaust gas. The estimated temperatures at the estimation points B, C, D are respectively referred to as temperatures B, C, D, hereafter. A temperature measurement point at which the exhaust gas temperature sensor 75a is mounted shall be referred to as a point A, and the DPF inlet gas temperature TIN shall be also referred to as a temperature A, hereafter.

A model for providing the temperatures. B, C, D at the estimation points B, C, D is expressed by a transfer function (3) consisting of a first-order time lag and a dead time. Thus, the temperatures B, C, D at the estimation points B, C, D are estimated by using the temperature A as an input. In the transfer function (3), letter T denotes a time constant, and letter L is the dead time.

$$\text{Transfer function} = \{1/(1+Ts)\} \cdot e^{-Ls}, \quad (3)$$

Figure 6:
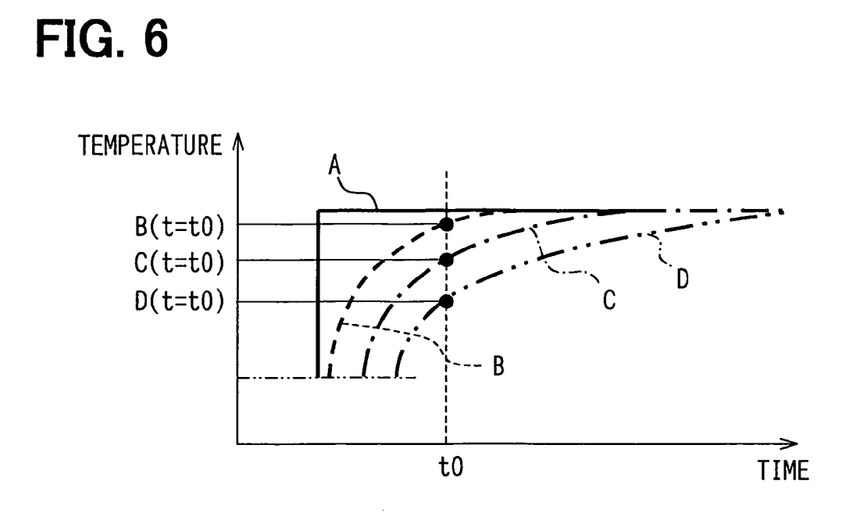
FIG. 6 is a graph showing characteristics of changes of temperatures in the DPF with time according to the third embodiment.

Changes in the temperatures A, B, C, D with time are shown in a graph of FIG. 6. The graph of FIG. 6 shows the situations of the step responses of the temperatures B, C, D with respect to the temperature A as the input. If the temperature A, or the temperature of the exhaust gas flowing into the DPF 5, changes stepwise, the change propagates to the points B, C, D. Due to the time required for the exhaust gas to reach the points B, C, D downstream of the point A, the temperatures B, C, D change in retard of the change of the temperature A and follow the temperature A. Then, the temperatures B, C, D gradually converge to the value of the temperature A. Therefore, the model expressed by the transfer function consisting of the first-order time lag and the dead time can appropriately estimate the temperatures inside the DPF 5.

Figure 7:
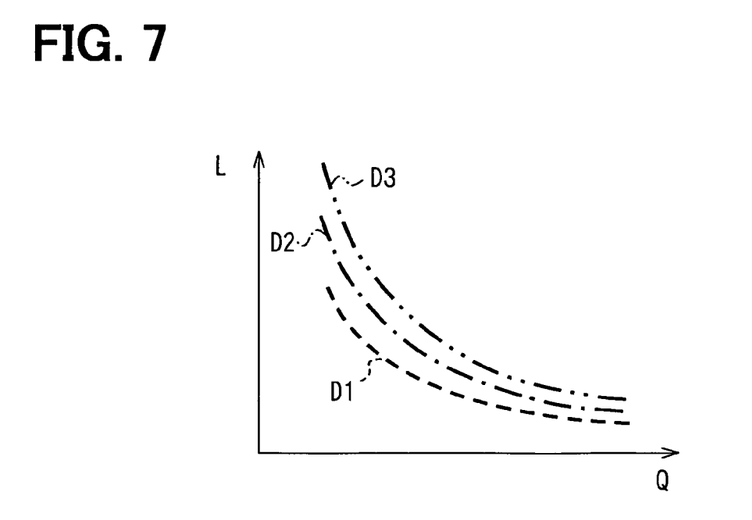
FIG. 7 is a graph showing characteristics of a dead time of the exhaust gas purification system according to the third embodiment.
Figure 8:
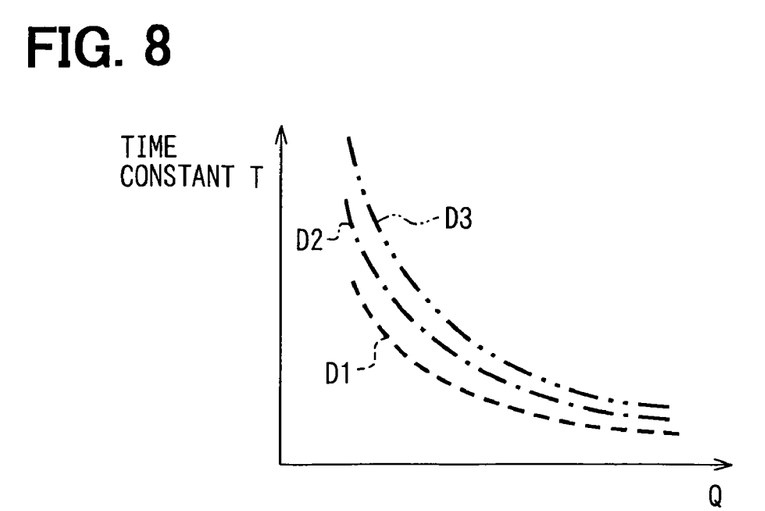
FIG. 8 is a graph showing characteristics of a time constant of the exhaust gas purification system according to the third embodiment.

The time lag at a certain point lengthens as the certain point recedes from the point A. Therefore, the time lag at the point D is longer than the time lag at the point C, and the time lag at the point C is longer than the time lag at the point B. Profiles of the changes of the temperatures B, C, D to follow the temperature A, or profiles of the following changes, are gentle due to a relatively large heat capacity of the DPF 5, whose base material is the ceramics. A speed of the following change at a certain point decreases as the certain point recedes downstream from the point A. Therefore, the speed of the following change at the point D is lower than the speed at the point C, and the speed at the point C is lower than the speed at the point B. When the flow rate Q of the exhaust gas is high and the exhaust gas flow velocity is high, the time lag shortens as a whole, and the speed of the following change rises. Accordingly, as shown in FIG. 7, the dead time L at a certain point is increased as a distance between the DPF inlet 51 and the certain point lengthens, and is decreased as the flow rate Q of the exhaust gas increases. In FIG. 7, a broken line D1 represents the dead time L corresponding to a distance D1, a chained line D2 represents the dead time L corresponding to a distance D2, and a double-dashed line D3 represents the dead time L corresponding to a distance D3. The distance D3 is longer than the distance D2. The distance D2 is longer than the distance D1. The time constant T of a certain point is increased as the distance between the DPF inlet 51 and the certain point increases, and is decreased as the flow rate Q of the exhaust gas increases as shown in FIG. 8.

Thus, the temperatures B, C, D at the estimation points B, C, D on the central line X of the DPF 5 can be respectively estimated from the temperature A sensed at the point A. The maximum value TMAX and minimum value TMIN among the temperatures A, B, C, D are respectively obtained, and the difference between the maximum value TMAX and the minimum value TMIN is employed as the range of the temperature distribution inside the DPF 5.

In Step S303 of the flowchart shown in FIG. 4, it is determined whether the difference between the maximum value TMAX and the minimum value TMIN of the temperatures inside the DPF 5 is "equal to or less than" a reference value β. Also in this case, the uniformity of the temperature distribution inside the DPF 5 can be determined based on whether the difference is equal to or less than 50° C., desirably 20° C. If the result of the determination in Step S303 is "YES", the PM deposition quantity ML is renewed in Step S304. If the result of the determination in Step S303 is "NO", the program returns to Step S301 without performing the processing of Step S304.

In the present embodiment, the temperature A actually sensed by the exhaust gas temperature sensor 75a is also used as the temperature for measuring the temperature distribution, in addition to the estimated temperatures B, C, D inside the DPF 5. It is because the temperature A can be regarded as the temperature at the most upstream part of the DPF 5. By additionally using the sensed temperature, the number of the points for estimating the temperatures can be reduced and an arithmetic load can be alleviated.

Next, several modified examples of the present embodiment for estimating the temperatures inside the DPF 5 will be described below. The temperatures inside the DPF 5 may be estimated based on the DPF outlet gas temperature TOUT. In this case, an inverse transfer function of the formula (3) is used as a model.

Alternatively, the temperatures at a certain part of the estimation points in the DPF 5 may be estimated based on the DPF inlet gas temperature TIN, and the temperatures at the other part of the estimation points may be estimated based on the DPF outlet gas temperature TOUT. In this case, the estimation points for estimating the temperatures in the DPF 5 based on the DPF inlet gas temperature TIN are set from the most upstream side of the DPF 5, and the temperatures at the other estimation points are estimated based on the DPF outlet gas temperature TOUT. Thus, the temperatures can be estimated highly precisely because the influence of estimation error factors such as disturbances at a certain estimation point can be reduced by reducing the distance between the certain estimation point and the point where the temperature is actually sensed by either one of the exhaust gas temperature sensors 75a, 75b.

In the present embodiment, the three estimation points B, C, D on the central line X of the DPF 5 are employed, but the number of the estimation points may be changed. If the number of the estimation points is increased, the uniformity of the temperature distribution in the DPF 5 can be determined more precisely. If the number of the estimation points is decreased, the arithmetic load can be alleviated.

Figure 9:
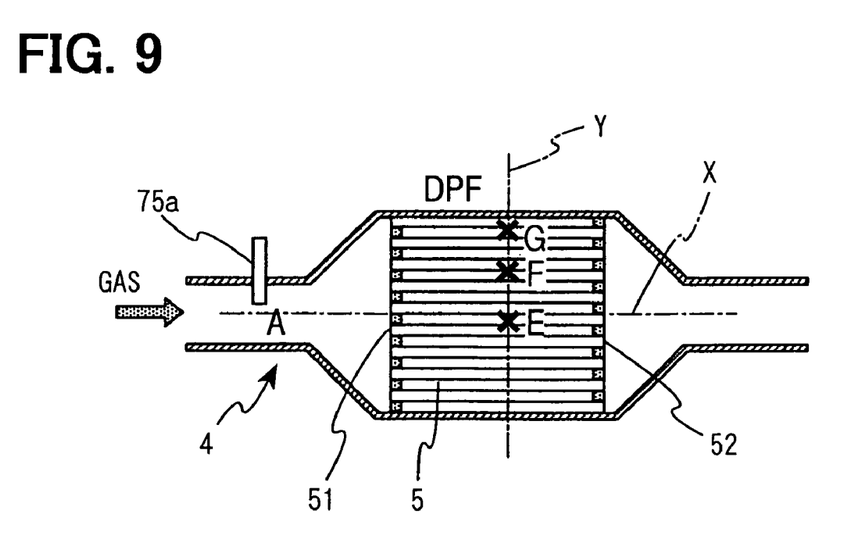
FIG. 9 is a schematic sectional view showing a DPF of an exhaust gas purification system of a modified example of the third embodiment.

In addition to the measurement of the temperature distribution in the DPF 5 along the central line X as the direction of the flow of the exhaust gas, the temperature distribution along a plane Y shown in FIG. 9 may be measured to determine the uniformity of the temperature distribution in the DPF 5. The plane Y is perpendicular to the central line X, and the honeycomb structure appears on the plane Y. Estimation points E, F, G in this case are shown in FIG. 9. The estimation point E is positioned on the central line X. The estimation points F, G are positioned on the plane Y and are radially distant from the central line X. The point G is positioned outside of the point F in the radial direction of the DPF 5.

The temperature E at the estimation point E on the central line X of the DPF 5 is estimated as explained above based on the temperature A sensed by the exhaust gas temperature sensor 75a.

The temperatures F, G at the estimation points F, G are calculated by multiplying the temperature E by a predetermined coefficient.

Figure 10:
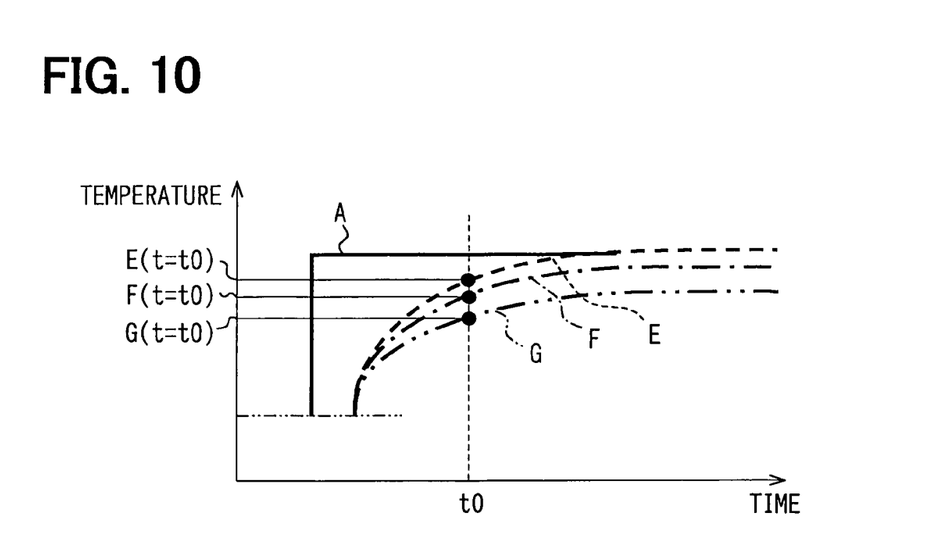
FIG. 10 is a graph showing characteristics of changes of temperatures in the DPF with time of the modified example of the third embodiment.

Changes of the temperatures A, E, F, G with time are shown in a graph of FIG. 10. The graph of FIG. 10 shows situations of step responses of the temperatures E, F, G with respect to the temperature A as the input. Since a distance between the estimation point E and the DPF inlet 51, a distance between the estimation point F and the DPF inlet 51 and a distance between the estimation point G and the DPF inlet 51 along the direction of the central line X are the same, the temperatures E, F, G start changing at the same timing. However, the temperature E at the estimation point E on the central line X increases the most, and the temperature G at the point G (the outermost position) increases the least. It is because the atmosphere in which the DPF 5 is mounted draws a large amount of heat from the outer peripheral part of the DPF 5. Thus, the temperature at a certain point of the DPF 5 decreases as the certain point approaches the outer periphery of the DPF 5. As the flow rate Q of the exhaust gas increases, the ratio of the amount of heat drawn by the atmosphere to the amount of heat entering the DPF 5 decreases. Thus, the influence of the drawing of the heat by the atmosphere is reduced, and a temperature gradient on the plane Y becomes gentle. Further, as the temperature of the atmosphere where the DPF 5 is mounted increases, the difference between the temperature of the atmosphere and the temperature of the DPF 5 itself decreases, and the amount of the heat drawn by the atmosphere decreases. Thus, the influence of the drawing of the heat by the atmosphere is reduced and the temperature gradient on the plane Y becomes gentle.

Figure 11:
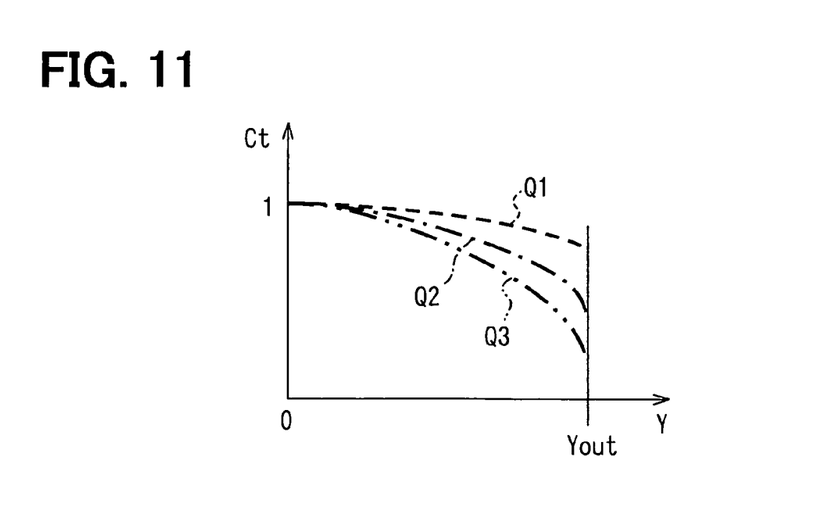
FIG. 11 is a graph showing characteristics of a coefficient of the exhaust gas purification system of the modified example of the third embodiment.
Figure 12:
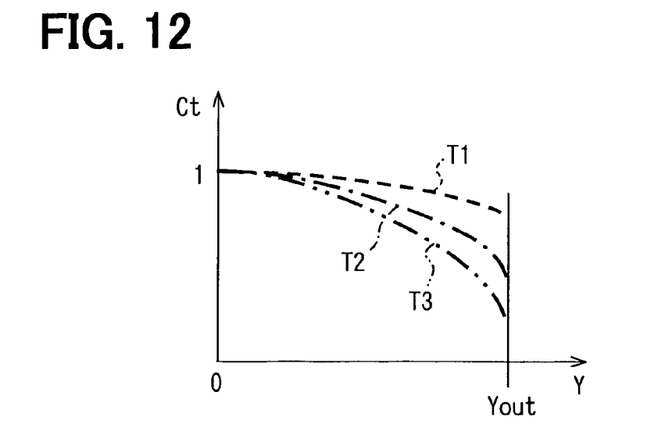
FIG. 12 is a graph showing characteristics of the coefficient of the exhaust gas purification system of the modified exampled of the third embodiment.

The temperature distribution on the plane Y is estimated by multiplying the temperatures E, F by a coefficient Ct, of which characteristics are shown in graphs of FIGS. 11 and 12. In FIG. 11 or 12, the axis Y represents the distance from the central line X along the direction of the plane Y, and Yout is a distance between the central line X and the outer periphery of the DPF 5. The coefficient Ct is a ratio of the temperature at the distance Y to the temperature at the central line X of the DPF 5. The coefficient Ct is decreased as the distance Y along the radial direction increases as shown in FIG. 11. Since the influence of the drawing of the heat by the atmosphere weakens as the flow rate Q of the exhaust gas increases, the coefficient Ct is increased as the flow rate Q of the exhaust gas increases as shown in FIG. 11. A broken line Q1 in FIG. 11 indicates the coefficient Ct used when the flow rate Q of the exhaust gas is Q1, a chained line Q2 is the coefficient Ct used when the flow rate Q is Q2, and a double-dashed line Q3 is the coefficient Ct used when the flow rate Q is Q3. The flow rate Q1 is greater than the flow rate Q2, and the flow rate Q2 is greater than the flow rate Q3. Since the amount of the heat drawn by the atmosphere in which the DPF 5 is mounted decreases as the temperature of the atmosphere (the outside temperature) increases, the coefficient Ct is increased as the outside temperature increases as shown in FIG. 12. In FIG. 12, a broken line T1 indicates the coefficient Ct used when the outside temperature is T1, a chained line T2 is the coefficient Ct used when the outside temperature is T2, and a double-dashed line T3 is the coefficient Ct used when the outside temperature is T3. The outside temperature T1 is higher than the outside temperature T2. The outside temperature T2 is higher than the outside temperature T3. The characteristics of the coefficient Ct shown in FIG. 11 are provided when the outside temperature is T1. The characteristics of the coefficient Ct shown in FIG. 12 are provided when the flow rate Q of the exhaust gas is Q1.

In this example, the range of the temperature distribution in the DPF 5 is determined based on the difference between the maximum value TMAX and minimum value TMIN among the temperatures A, E, F, G.

Alternatively, the temperatures at multiple points positioned on the central line X may be estimated, and then, the temperatures at another points, which are not positioned on the central line X, may be estimated based on the estimates of the temperatures at the points positioned on the central line X. In this case, multiple planes Y may be set so that the multiple planes Y are perpendicular to the central line X and contain the multiple estimation points on the central line X (at which the temperatures are estimated) on a one-on-one basis, and the temperatures at the estimation points on the respective planes Y may be estimated. Alternatively, one plane Y may be set so that the plane Y is perpendicular to the central line X and contains one out of the estimation points on the central line X at which the temperatures are estimated.

The exhaust gas contains unburned components such as hydrocarbon or carbon monoxide. In the case where the DPF 5 has the oxidation catalyst, the unburned components are combusted to generate heat when the temperature of the catalyst is at an activation temperature or above (for example, 200° C. or above). In such a case, an increase in the temperature due to the heat generation, which is caused by the combustion of the unburned components, causes an estimation error of the temperature inside the DPF 5. Therefore, correction for canceling the error caused by combusting the unburned components should be preferably performed. In order to perform the correction, corresponding relationships for associating the emission quantities of the hydrocarbon and the carbon monoxide with the engine rotation speed NE of the engine and the fuel injection quantity are first stored as a map or the like. Then, the emission quantities of the hydrocarbon and the carbon monoxide are calculated in accordance with the present engine rotation speed NE and the present fuel injection quantity. Then, the heat generation amount is calculated from the emission quantities of the hydrocarbon and the carbon monoxide. The heat capacity of the exhaust gas is calculated based on the exhaust gas flow rate Q. Then, the heat capacity of the entire elements, which receive the heat generated by the unburned components, is estimated based on the heat capacity of the exhaust gas and the heat capacity of the DPF 5, which is stored beforehand. The temperature increase due to the combustion of the unburned components is calculated from the heat generation amount and the heat capacity.

If the exhaust gas enters the DPF 5, the exhaust gas flows downstream while being combusted. Therefore, the temperature increase at a certain point depends on the distance between the DPF inlet 51 and the certain point along the direction of the central line X. Accordingly, the temperature increase should be preferably set larger as the distance increases.

Other than the above method, as a method of correcting the temperature increase due to the combustion of the unburned components, a method of storing a corresponding relationship for associating the temperature increase due to the combustion of the unburned components with the exhaust gas flow rate Q as a map and the like beforehand and of performing the correction in reference to the map may be employed.

The correction of the temperature increase due to the combustion of the unburned components is performed in a state in which the catalyst is at the activation temperature or above. It is determined whether the temperature of the catalyst is equal to or higher than the activation temperature based on whether the DPF inlet temperature TIN exceeds a predetermined reference value, for instance.

In order to alleviate the arithmetic load of the correction of the temperature increase due to the combustion of the unburned components, the temperature at a point positioned on the central line X of the DPF 5 at the upstream portion thereof and the temperature at another point positioned on the outer peripheral part of the DPF 5 distant from the central line X in the downstream portion thereof are estimated. Alternatively, the temperature at a point positioned on the central line X of the DPF 5 at the downstream portion thereof, and the temperature at another point positioned on the outer peripheral part of the DPF 5 distant from the central line X in the upstream portion thereof may be estimated. In any one of the above two cases, the temperature difference is maximized between the respective two points. Any other estimation points may be added to either set of the two points.

Fourth Embodiment

Figure 13:
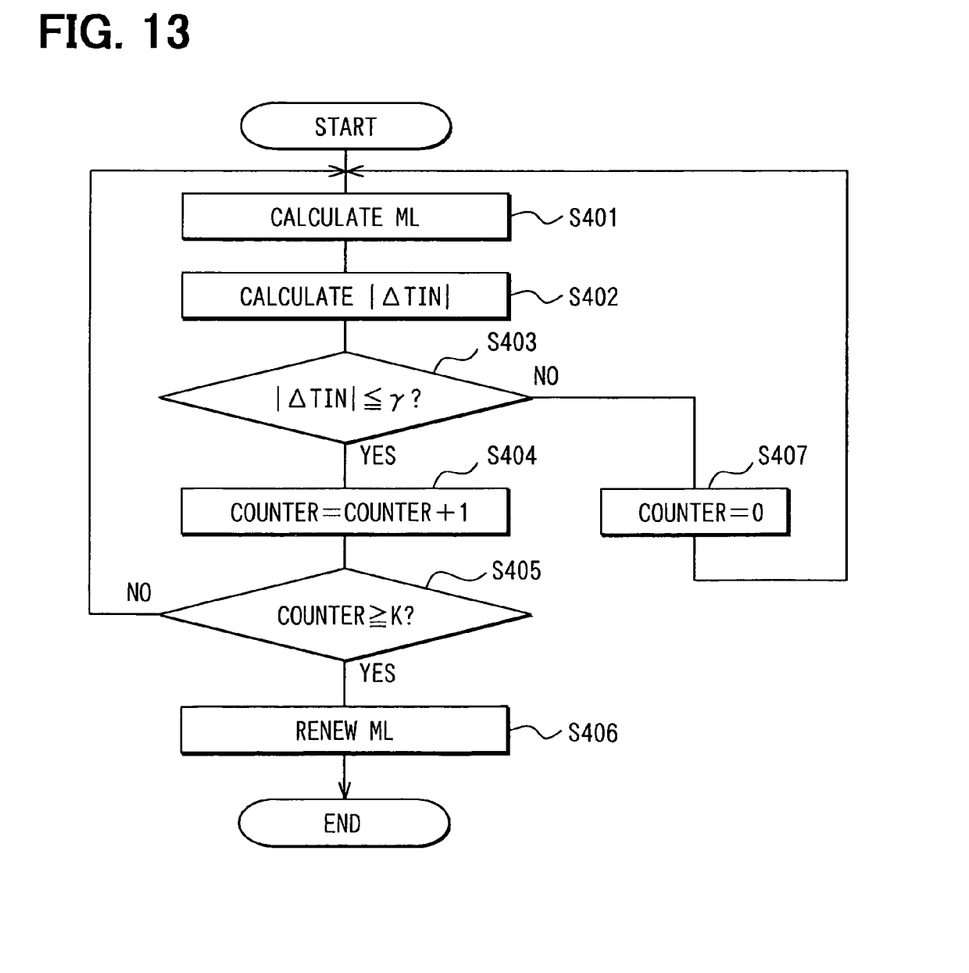
FIG. 13 is a flowchart showing control performed by an ECU of an exhaust gas purification system according to a fourth embodiment of the present invention.

Next, processing for renewing a PM deposition quantity ML performed by an ECU of an exhaust gas purification system of an internal combustion engine according to a fourth embodiment of the present invention will be explained based on FIG. 13.

In Step S401, the PM deposition quantity ML is calculated. Then, in Step S402, a variation ΔTIN (an absolute value) in the DPF inlet gas temperature TIN is calculated. The variation ΔTIN in the DPF inlet gas temperature TIN is a variation per unit time and is calculated by calculating a difference between the value of the DPF inlet gas temperature TIN inputted at the present time and the value of the DPF inlet gas temperature TIN inputted at the previous time.

In Step S403, it is determined whether the variation ΔTIN in the DPF inlet gas temperature TIN is "equal to or less than" a predetermined reference value γ. As explained above, if the temperature of the exhaust gas entering the DPF 5 changes, the change propagates to the downstream parts in retard of the change in the temperature of the entering exhaust gas. Therefore, a temperature difference (temperature distribution) along the direction of the central line X can be estimated based on the variation ΔTIN in the DPF inlet gas temperature TIN. When the variation ΔTIN in the DPF inlet gas temperature TIN is small, it can be estimated that the temperature distribution inside the DPF 5 is substantially uniform. If the result of the determination in Step S403 is "YES", it is determined that the temperature distribution inside the DPF 5 is substantially uniform, and the program proceeds to Step S404. In Step S404, a variable "COUNTER" is incremented by one. The variable "COUNTER" is a variable for counting the number of times the affirmative result ("YES") is provided by the determination in Step S403. If the result of the determination in Step S403 is "NO", the variable "COUNTER" is reset to zero in Step S407. Then, the program returns to Step S401 to repeat the processing of Steps S401 to S403. Thus, the variable "COUNTER" indicates the number of times the affirmative result ("YES") is successively provided by the determination in Step S403, in which it is determined whether the variation ΔTIN of the DPF inlet gas temperature TIN is "equal to or less than" the reference value γ.

In Step S405, it is determined whether the variable "COUNTER" is "equal to or greater than" a predetermined number K. If the result of the determination in Step S405 is "YES", the PM deposition quantity ML is renewed in Step S406. If the result of the determination in Step S405 is "NO", the program returns to Step S401. Thus, even if the result of the determination in Step S403 is "YES", or even if it is determined that the variation ΔTIN of the DPF inlet gas temperature TIN is equal to or less than the reference value γ, the PM deposition quantity ML calculated in Step S401 is not validated unless the number of times the affirmative result ("YES") is successively provided by the determination in Step S403 reaches the number K. Thus, the precision of the determination of the deposited state of the particulate matters can be improved.

Fifth Embodiment

Figure 14:
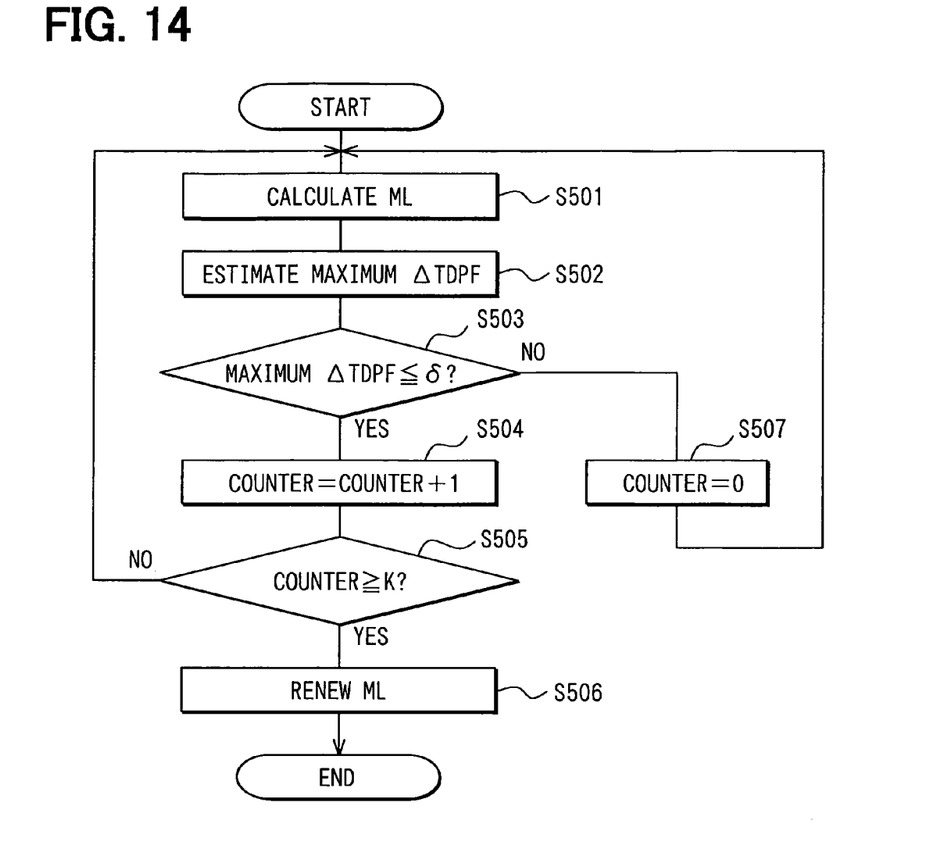
FIG. 14 is a flowchart showing control performed by an ECU of an exhaust gas purification system according to a fifth embodiment of the present invention.

Next, processing for renewing a PM deposition quantity ML performed by an ECU of an exhaust gas purification system of an internal combustion engine according to a fifth embodiment of the present invention will be explained based on FIG. 14.

First, in Step S501, the PM deposition quantity ML is calculated. Then, in Step S502, the maximum value among variations ΔTDPF in the temperatures TDPF inside the DPF 5 is calculated. More specifically, in Step S502, the temperatures TDPF at multiple points inside the DPF 5 are obtained first. The temperatures TDPF can be obtained by using the method of the second embodiment or the third embodiment. Subsequently, the variations ΔTDPF in the sensed or estimated temperatures TDPF of the respective points are calculated. Each variation ΔTDPF is obtained by calculating a difference between the value of the temperature TDPF sensed or estimated at the present time and the value of the temperature TDPF sensed or estimated at the previous time, as in the fourth embodiment. Lastly, the maximum value among the variations ΔTDPF of the sensed or estimated temperatures TDPF at the respective points is obtained.

Then, in Step S503, it is determined whether the maximum value of the temperature variations ΔTDPF obtained in Step S502 is "equal to or less" than a predetermined reference value δ. The change in the temperature inside the DPF 5 is caused not only by the change of the temperature of the exhaust gas flowing into the DPF 5 but also by the combustion of the unburned components. Accordingly, even when the DPF inlet gas temperature TIN does not change largely, there is a possibility that the temperature changes largely at the downstream part of the DPF 5 and the like. Therefore, by using the maximum value among the temperature variations ΔTDPF as the index of the temperature distribution, the uniformity of the temperature distribution of the DPF 5 can be determined more precisely. If the result of the determination in Step S503 is "YES", it is determined that the temperature distribution inside the DPF 5 is substantially uniform, and the program proceeds to Step S504. In Step S504, a variable "COUNTER" is incremented by one. If the result of the determination in Step S503 is "NO", the variable "COUNTER" is reset to zero in Step S507, and the program returns to Step S501.

In Step S505 subsequent to Step S504, it is determined whether the variable "COUNTER" is "equal to or greater than" a predetermined number K. If the result of the determination in Step S505 is "YES", the PM deposition quantity ML is renewed in Step S506. If the result of the determination in Step S505 is "NO", the program returns to Step S501.

The above embodiments need not include all the elements of the hardware structure shown in FIG. 1. For instance, in the case where the temperatures inside the DPF 5 are estimated from the DPF inlet gas temperature TIN alone, the exhaust gas temperature sensor 75b for sensing the DPF outlet gas temperature TOUT can be omitted.

The present invention should not be limited to the disclosed embodiments, but may be implemented in many other ways without departing from the spirit of the invention.

What is claimed is:

1. A method of purifying exhaust gas of an internal combustion engine, which includes a particulate filter disposed in an exhaust passage for collecting particulate matters contained in exhaust gas, the method comprising:

calculating a value of a deposited amount of the particulate matters deposited on the particulate filter based on a state of the exhaust gas including a differential pressure between an inlet and an outlet of the particulate filter;

measuring a temperature distribution inside the particulate filter; and invalidating the calculated value of the deposited amount of the particulate matters when uniformity of the temperature distribution inside the particulate filter is low;

wherein the uniformity of the temperature distribution decreases as a range of temperatures at multiple points inside the particulate filter increases, and the multiple points are arranged on a central axis of the particulate filter or on a plane perpendicular to the central axis.

2. The method as in claim 1, wherein the temperature distribution is uniform when a difference between the temperatures at the multiple points inside the particulate filter resides in a range from minus 50° C. to plus 50° C.

3. The method as in claim 1, wherein the multiple points include the inlet or the outlet of the particulate filter.

4. The method as in claim 1, wherein measuring the temperature distribution includes:

sensing the temperature at a certain point of the particulate filter; and estimating the temperature at another point, which is distant from the certain point along a direction of a flow of the exhaust gas, by using a transfer function of a first-order delay model or an inverse transfer function of the first-order delay model, based on the temperature at the certain point.

5. The method as in claim 4, wherein the multiple points include the inlet and the outlet of the particulate filter, and the temperature in a certain area downstream of the inlet of the particulate filter with respect to the flow of the exhaust gas is estimated based on the temperature at the inlet of the particulate filter, and the temperature in the other area extending to the outlet is estimated based on the temperature at the outlet.

6. An exhaust gas purification system of an internal combustion engine, which includes a particulate filter disposed in an exhaust passage for collecting particulate matters contained in exhaust gas and calculates a deposited amount of the particulate matters deposited on the particulate filter based on a state of the exhaust gas including a differential pressure between an inlet and an outlet of the particulate filter, the exhaust gas purification system comprising:

measuring means for measuring temperature distribution inside the particulate filter; and invalidating means for invalidating the calculated value of the deposited amount of the particulate matters when uniformity of the temperature distribution inside the particulate filter is low;

wherein the measuring means determines that the uniformity of the temperature distribution decreases as a range of temperatures at multiple points inside the particulate filter increases, and the multiple points are arranged on a central axis of the particulate filter or on a plane perpendicular to the central axis.

7. The exhaust gas purification system as in claim 6, wherein the measuring means determines that the temperature distribution is uniform when a difference between the temperatures at the multiple points inside the particulate filter resides in a range from minus 50° C. to plus 50° C.

8. The exhaust gas purification system as in claim 6, wherein the multiple points include the inlet or the outlet of the particulate filter.

9. The exhaust gas purification system as in claim 6, wherein the measuring means includes:

sensing means for sensing the temperature at a certain point of the particulate filter; and estimating means for estimating the temperature at another point, which is distant from the certain point along a direction of a flow of the exhaust gas, by using a transfer function of a first-order delay model or an inverse transfer function of the first-order delay model, based on the temperature at the certain point.

10. The exhaust gas purification system as in claim 9, wherein the multiple points include the inlet and the outlet of the particulate filter, and the estimating means estimates the temperature in a certain area downstream of the inlet of the particulate filter with respect to the flow of the exhaust gas based on the temperature at the inlet of the particulate filter, and estimates the temperature in the other area extending to the outlet based on the temperature at the outlet.

11. An exhaust gas purification system of an internal combustion engine, which includes a particulate filter disposed in an exhaust passage for collecting particulate matters contained in exhaust gas and calculates a deposited amount of the particulate matters deposited on the particulate filter based on a state of the exhaust gas including a differential pressure between an inlet and an outlet of the particulate filter, the exhaust gas purification system comprising:

measuring means for measuring temperature distribution inside the particulate filter; and invalidating means for invalidating the calculated value of the deposited amount of the particulate matter when uniformity of the temperature distribution inside the particulate filter is low, wherein the measuring means determines that the uniformity of the temperature distribution decreases as a difference between temperatures as multiple points inside the particulate filter increases, and the temperature difference inside the particulate filter is larger than a temperature difference caused by a heat capacity difference of the particulate matters unevenly existing inside the particulate filter.

12. The exhaust gas purification system as in claim 11, wherein the measuring means determines that the temperature distribution is uniform when a difference between the temperatures at the multiple points inside the particulate filter resides in a range from minus 50° C. to plus 50° C.

13. The exhaust gas purification system as in claim 11, wherein the multiple points include the inlet or the outlet of the particulate filter.

14. The exhaust gas purification system as in claim 11, wherein the measuring means includes:

sensing means for sensing the temperature at a certain point of the particulate filter; and estimating means for estimating the temperature at another point, which is distant from the certain point along a direction of a flow of the exhaust gas, by using a transfer function of a first-order delay model or an inverse transfer function of the first-order delay model, based on the temperature at the certain point.

15. The exhaust gas purification system as in claim 14, wherein the multiple points include the inlet and the outlet of the particulate filter, and the estimating means estimates the temperature in a certain area downstream of the inlet of the particulate filter with respect to the flow of the exhaust gas based on the temperature at the inlet of the particulate filter, and estimates the temperature in the other area extending to the outlet based on the temperature at the outlet.

* * * * *